United States Patent
Li et al.

(10) Patent No.: US 9,762,401 B2
(45) Date of Patent: Sep. 12, 2017

(54) METHOD AND APPARATUS FOR MANAGING DATA TRANSMISSION IN A COMMUNICATION NETWORK

(71) Applicant: Alcatel Lucent, Boulogne Billancourt (FR)

(72) Inventors: Jie Li, Melbourne (AU); Chien Aun Chan, Point Cook (AU); Ka-Lun Lee, Melbourne (AU); Nagaraj Anthapadmanabhan, Bridgewater, NJ (US); Dinh Thi Thuy Nga, Seoul (KR)

(73) Assignee: Alcatel Lucent, Boulogne-Billancourt (FR)

( * ) Notice: Subject to any disclaimer, the term of this patent is extended or adjusted under 35 U.S.C. 154(b) by 332 days.

(21) Appl. No.: 14/041,945

(22) Filed: Sep. 30, 2013

(65) Prior Publication Data

US 2015/0092789 A1    Apr. 2, 2015

Related U.S. Application Data

(60) Provisional application No. 61/756,878, filed on Jan. 25, 2013, provisional application No. 61/875,302, filed on Sep. 9, 2013.

(51) Int. Cl.
| | |
|---|---|
| *H04L 5/00* | (2006.01) |
| *H04L 12/00* | (2006.01) |
| *H04W 56/00* | (2009.01) |
| *H04J 14/00* | (2006.01) |
| *H04Q 11/00* | (2006.01) |

(52) U.S. Cl.
CPC ............. *H04L 12/00* (2013.01); *H04J 14/00* (2013.01); *H04L 5/0082* (2013.01); *H04Q 11/00* (2013.01); *H04W 56/00* (2013.01); *H04Q 2213/13292* (2013.01); *H04Q 2213/13332* (2013.01)

(58) Field of Classification Search
CPC ............................. H04W 56/00; H04L 5/0082
See application file for complete search history.

(56) References Cited

U.S. PATENT DOCUMENTS

| | | | |
|---|---|---|---|
| 2006/0013160 A1* | 1/2006 | Haartsen ....................... | 370/328 |
| 2012/0177361 A1 | 7/2012 | Hirano et al. | |
| 2012/0301145 A1* | 11/2012 | Kozaki et al. .................. | 398/58 |
| 2014/0186035 A1* | 7/2014 | Lee et al. ......................... | 398/45 |

FOREIGN PATENT DOCUMENTS

WO   PCT/IB2014/000767       9/2014

OTHER PUBLICATIONS

"Toward energy-efficient 1G-EPON and 10G-EPON with sleep-aware MAC control and scheduling", Feb. 1, 2011, Zhang et al.*

(Continued)

*Primary Examiner* — John Blanton
(74) *Attorney, Agent, or Firm* — Stephen J. Wyse

(57) ABSTRACT

A manner of managing data transmission and operating-mode transitions in a communication network. A network node having a transmitter and receiver is selectively transitioned into a Transmit state, where the Transmit state is a condition wherein the transmitter is turned on for data transmission only during timeslots provided for by a PBW (pre-allocation bandwidth) and remains off otherwise. The PBW and clock drift allowance permits the receiver to remain off during all or most of the Transmit state.

16 Claims, 10 Drawing Sheets

(56) References Cited

OTHER PUBLICATIONS

Jingjing Zhang et al: "Toward Energy-Efficient 1 G-EPON and 1 OG-EPON With Sleep-Aware MAC Control and Scheduling", IEEE Communications Magazine, IEEE Service Center, Piscataway, US, vol. 49, No. 2, Feb. 1, 2011 (Feb. 1, 2011), pp. s33-s38.
Lei Shi et al: "Energy-Efficient PON With Sleep-Mode ONU: Progress, Challenges, and Solutions", IEEE Network, IEEE Service Center, New York, NY, US, vol. 26, No. 2, Mar. 1, 2012 (Mar. 1, 2012), pp. 36-41.
Sam Sambasivan AT&T et al: "Proposed Text for G.987.3 and G.988 Power Saving", ITU-T DRAFT ; Study Period 2009-2012, International Telecommunication Union, Geneva; CH, vol. 2, May 4, 2010 (May 4, 2010), pp. 1-18.
Editors G 984 3: "White Paper : Means and Impact of GPON Power Conservation: 97 (WP 1/ 15)". ITU-T DRAFT: Study Period 2009-2012, International Telecommunication Union, Geneva; CH, vol. 2/15, Nov. 30, 2008 (Nov. 30, 2008), pp. 1-53.
Valcarenghi L et al: "Energy Efficiency in Passive Optical Networks: Where, When, and How?". IEEE Network, IEEE Service Center, New York, NY, US, vol. 26, No. 6, Nov. 1, 2012 (Nov. 1, 2012), pp. 61-68.

\* cited by examiner

METHOD AND APPARATUS FOR MANAGING DATA TRANSMISSION IN A COMMUNICATION NETWORK

CROSS-REFERENCE TO RELATED APPLICATIONS

The present disclosure is related to and claims priority from U.S. Provisional Patent Application Ser. No. 61/756,878, entitled Sleep Mode Mechanisms for Point-to-Point and Time-division Multiplexed Passive Optical Networks and filed on 25 Jan. 2013, and from U.S. Provisional Patent Application Ser. No. 61/875,302, entitled Method and Apparatus for Low-Power Mode Data Transmission and filed on 9 Sep. 2013, the entire contents of which applications are incorporated by reference herein.

TECHNICAL FIELD

The present invention relates generally to the field of communication networks, and, more particularly, to a method and apparatus for operating-mode management to, among other things, facilitate data transmission over a shared communication channel while a node or nodes of the network are operating in a low-power mode.

BACKGROUND

The following abbreviations are herewith defined, at least some of which are referred to within the following description of the state-of-the-art and the present invention.
DBA Dynamic Bandwidth Allocation
DM Doze Mode
DS Downstream
DSM Dynamic Sleep Mode
EA Ethernet Aggregation
GPON Gigabit PON
FSM Fixed cyclic Sleep Mode
FWI Forced Wakeup Indication
LPTM Low-Power Transmit Mode
LSI Local Sleep Indication
LWI Local Wakeup Indication
OLT Optical Line Terminal
ONU Optical Network Unit
PBW Pre-allocated Band Width
PON Passive Optical Network
PtP Point to Point
SA Sleep Allow
SM Sleep Mode
SR Status Report
STM Sleep-Transmit Mode
TDM Time Division Multiplexing
UNI User Network Interface
QoS Quality of Service
US Upstream
XG-PON 10-Gigabit PON A computer network, generally speaking, includes a number of computing devices linked together for any of a number of reasons including the sharing of data and computing resources and the control of remote devices. In addition, a major function of many if not all computer networks is communication between two or more entities within or through the network, and for this reason networks performing this function will generally be referred to as communication networks. Communication networks may be implemented in a wide variety of environments, some of which are described herein.

Likewise, a wide variety of computing devices, sometimes referred to as nodes, some common and some more specialized, may be used in communication networks. The nodes of a communication network frequently though not universally contain a transmitter for forming and sending signals representing data over a communication channel, and a receiver for receiving and processing signals sent from another node. The communication channel may take several forms, including a wire or cable, an optical fiber, or radio or microwave frequency. The channel between any two devices may or may not be a direct connection; a number of intervening components or transmission media may be involved.

A shared communication channel is one used for transmission by multiple devices, where some agreed protocol or method of operation must be in place to avoid or otherwise deal with simultaneous transmissions. Note that in this context, concurrent use of a single medium may be facilitated by the use, for example, of separate radio frequencies or light wavelengths so the transmissions do not unduly interfere with each other. But in that case, each frequency or wavelength forms a separate channel (which may or may not be shared with other devices).

As with any network, efficient operation of communication networks is always a goal and there have been many improvements made in this endeavor. One improvement that has been made is the introduction of different operating states and modes. In this context, "state" describes the condition of certain components of a network node, for example whether the transmitter and receiver are turned on for use or off to save power. An operating "mode" usually anticipates cycling or a combination of transitions between two or more different states while the node is in that mode. Both the mode duration and the state transitions while in the mode may be based on a set schedule period or on the occurrence of one or more events.

When a component is in an "awake" state, for example, it is usually considered fully operational. In this state, however, it is consuming whatever amount of power this constant level of operation requires. To reduce the power consumption, a component may, for example, be put in a "sleep" state when it is not needed. In the sleep state the component usually does not send or receive communications, but turns off its transmitter and receiver to operate with minimal-power usage. A component in a sleep state may "awaken" at the appropriate time or when prompted in some other manner. A low-power mode may involve periodic cycling between the awake and sleep states.

As should be apparent, care must be used when executing operating-mode changes so as not to unduly disrupt desirable communications while still reaping the benefits of power-saving modes of operation. Redundant equipment, for example, may be put in sleep mode during periods when little communication activity is underway. An increase in traffic may in this case cause sleeping components to awaken, or they may do so according to some schedule. In some cases, components may be put in a sleep state where the any arising transmissions can be buffered to be sent after a return to the awake state. In this case, there is a trade-off between power savings and some delay in transmission.

These and other problems are addressed by embodiments of the present invention.

Note that the techniques or schemes described herein as existing, possible, or desirable are presented as background for the present invention, but no admission is made thereby that these techniques and schemes or the need for them were heretofore commercialized or known to others besides the inventors.

SUMMARY

The present invention is directed to a manner of managing operating-mode transitions in communication networks, and is considered especially advantageous for facilitating communications over a shared channel.

In one aspect, the present invention is a method of managing data transmission in a communication network, including transitioning a network node into a Transmit state, the node having a transmitter and a receiver for data transmission, and wherein the Transmit state is a condition wherein the transmitter is turned on for data transmission only during timeslots provided for by a PBW (pre-allocated bandwidth) and remains off otherwise. In some embodiments, in the Transmit state the transmitter is only turned on for data transmission only during timeslots provided by the PBW when there is data available to transmit. The receiver preferably remains off during the Transmit state.

According to this aspect, the method may further include transitioning the network node into a low-power transmit mode, wherein the low-power transmit mode includes in addition to the Transmit state a Full-Power state in which both the transmitter and the receiver are on and a Low-Power state in which the transmitter is off. The receiver is preferably also off during the Low-Power state.

According to this aspect, the method may further include, while in the low-power transmit mode, cycling between the Full-Power state and the Low-Power state, wherein the network node only transitions into the Transmit state from the Low-Power state. Timers may be set at the entry to each state to control the cycles. The timers may be configured by a control node in communication with the network node. In some embodiments the network is a PON (passive optical network), the network node is an ONU (optical network unit), and the control node is an OLT (optical line terminal)

According to this aspect, the method may further include receiving the PBW in the network node; the PBW may be received from the control node. In a preferred embodiment, the control node calculates the PBW. The PBW calculation may take into account the network node's transmission history and, if the network node transmits over a shared communication channel, the transmission needs and history of the other nodes sharing the channel. The PBW preferably includes guard intervals applied to the time slots to mitigate the effect of clock drift.

In another aspect, the present invention is a method of pre-allocating bandwidth for low-power-mode data transmissions in a communication network. In a preferred embodiment, the pre-allocation is a function of the anticipated need for transmissions by an individual node. In this embodiment, the method may also include pre-allocating bandwidth for low-power-mode data transmissions by all or at least a plurality of the nodes using a shared communication channel, which nodes may be placed in a low-power state at generally the same time. The method may also include assigning pre-allocated bandwidth guard intervals based on an anticipated clock drift.

In another aspect the present invention is a method of determining the amount of bandwidth to be pre-allocated. In a preferred embodiment, the method may also include determining the pre-allocated bandwidth for low-power-mode data transmissions for all or at least a plurality of the nodes using a shared communication channel, which nodes may be placed in a low-power state at generally the same time.

In another aspect, the present invention is a node for communicating in a communications network such as an optical access network. The node may be, for example an ONU that is operable to enter a low-power transmit mode. In this embodiment, the ONU may receive a message, for example from an OLT, instructing the ONU to enter the low-power-transmit mode. In this case, the message, or a second message, contains a pre-allocated bandwidth assignment indicating the time slot or slots during which the ONU may transmit upstream data to the OLT while in the low-power transmit state. The ONU preferably determines whether to enter the low-power mode after determining that it currently has no upstream traffic to send. It is also preferable that the ONU sends a status message to the OLT indicating that it is or is not entering the low-power transmit mode. In one embodiment, the ONU enters low-power transmit mode, detects upstream traffic, and powers the transmitter to transmit the upstream traffic during the time slot or slots allocated to the ONU in the pre-allocated bandwidth message. In this case, the time slot or slots preferably take into account guard intervals to anticipate clock drift. The guard intervals may be calculated by the ONU or received in a message, for example from the OLT, or by the components working together. The anticipated clock drift may be based on specified values for the respective nodes or on historical experience, or both.

In another embodiment according to this aspect of the present invention, the communications network node is an OLT in an optical access network. In this embodiment, the OLT calculates a pre-allocated bandwidth for one or more ONUs and communicates the pre-allocated bandwidth to the ONUs. An instruction to enter low-power transmit mode is also communicated and, subsequently, a status message is preferably received from the one or more ONUs. In some embodiments, the OLT calculates an anticipated clock drift and the time slot or slots in the pre-allocated bandwidth include guard intervals based on this calculation. The anticipated clock drift may be based on specified values for the respective nodes or on historical experience, or both. The OLT preferably determines whether downstream traffic addressed to the one or more ONUs is present prior to sending instructions concerning entering low-power transmit mode. In this aspect, it is preferred that the OLT attempts to place all of the nodes, such as ONUs, sharing a given communication channel into low-power transmit mode at generally the same time, and, if that is successfully executed, enters a low-power state or mode while the nodes are anticipated to be in the low-power transmit mode.

In another aspect, the present invention is a system that is operable to manage data transmission including placing one or more nodes in a low-power transmit state. In this aspect, it is preferred that the nodes communicate as described above, and that the upstream node, such as an OLT, attempts to place all of the nodes, such as ONUs, sharing a given communication channel into low-power transmit mode at generally the same time, and, if that is successfully executed, enter a low-power state or mode while the nodes are anticipated to be in the low-power transmit mode. It is also preferable that the nodes synchronize prior to low-power state mode entry.

In another aspect, the present invention is a non-transitory memory device or devices including program instructions that when executed cause the respective devices to operate in the manner described above.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present invention is directed to a manner of managing operating-mode transitions in communication networks, and is considered especially advantageous for facilitating communications over a shared channel. As mentioned above, the goal of any such effort is to optimize power-saving while minimizing traffic disruptions. No particular result is a requirement of the invention, however, unless explicitly set out in a particular embodiment.

An embodiment of the present invention may be described in terms of an optical access network. Optical access networks, a type of communication network, are becoming more and more common. An access network is, generally speaking, that portion of a larger network that reaches from the core of the communications network to individual subscribers. Despite the cost of installing optical fibers some or all of the way to each subscriber premises, the potential capacity of a fiber access network still makes it an attractive option. An optical fiber access network can handle a wide variety of services including Internet access, television programming, and telephone service.

Figure 1:
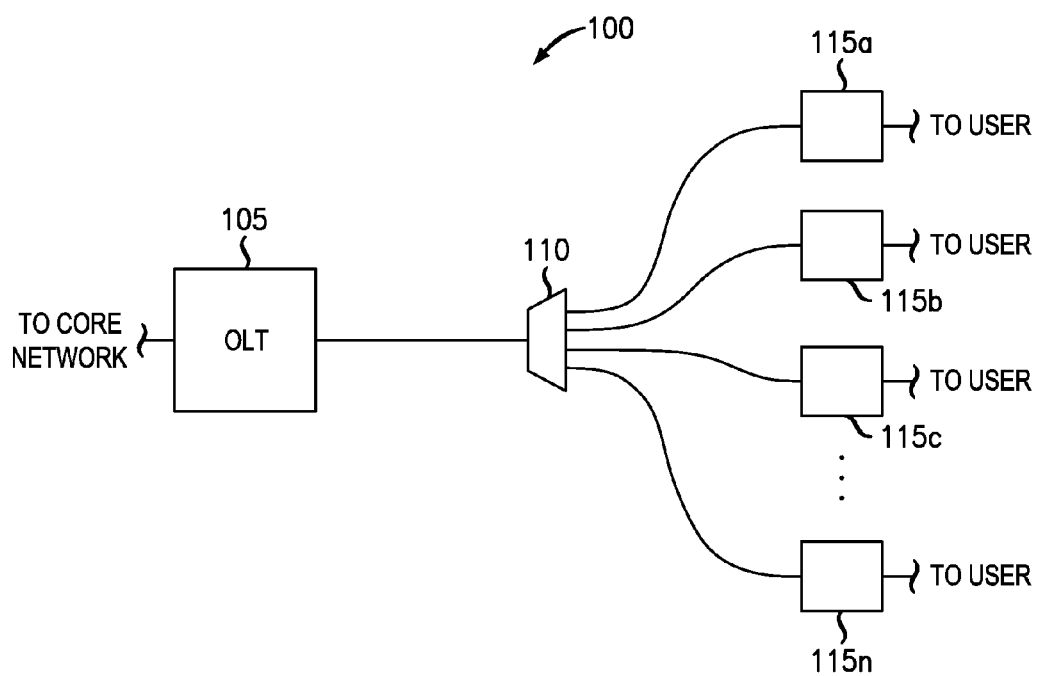
FIG. 1 is a simplified schematic diagram illustrating selected components of an exemplary PON.

One type of optical access network is a PON (passive optical network). FIG. 1 is a simplified schematic diagram illustrating selected components of an exemplary PON. ONUs (optical network units) 115a through 115n are devices typically found at the subscribers' (user's) homes or other premises. As the ellipsis in FIG. 1 implies, in a PON there may be any number of such devices that are associated with a single optical splitter. The optical fibers connecting the splitter to the ONUs it serves are generally referred to as access (or "drop") fibers. The optical splitter is typically located in a street cabinet or similar structure with many other optical splitters (not shown for clarity), each serving their own set of ONUs (optical network units). An ONU may also be a terminal device that serves many subscribers, such as at an apartment building. Some ONUs are also or instead referred to as ONTs (optical network terminals).

In the exemplary PON 100 of FIG. 1, an OLT (optical line terminal) 105 interfaces with a core network (not necessarily using optical signals). In this capacity, OLT 105 forms the optical signals for transmission downstream to ONUs 115a through 115n along a feeder fiber to optical splitter 110. Optical splitter 110 is typically a passive device that simply distributes the signal received from OLT 105 to all the ONTs it serves. Each ONU is then responsible for selecting the portions of the transmitted signal that are intended for its subscriber and passes them along. Other portions of the transmitted signal are simply discarded. Upstream transmissions by ONUs are frequently made according to a schedule established by the OLT to avoid interference with each other, and on a light wavelength band different from that used for downstream transmissions to avoid interference between upstream and downstream signals.

In conventional optical access networks based on PON technology, the ONUs and the OLTs are constantly powered-on and consume a significant amount of power even during idle periods. As alluded to above, various mechanisms have been proposed to conserve network energy by putting the ONUs into a low-power or sleep state where some components of the ONU are turned off Standard sleep mode mechanisms for the ONUs have been defined, for example, by the International Telecommunication Union-Telecom Standardization Sector (ITU-T) for GPON (Gigabit PON) and XG-PON (10-gigabit PON).

As also mentioned above, in introducing such power saving schemes, there is usually a trade-off between the achievable power saving and the resulting packet delay as the packets are required to be buffered during the sleep periods. In the case of a PON, the downstream (DS) packets are buffered at the OLT and the upstream (US) packets are buffered at the ONU during the sleep period. Excess buffering delay, of course, may eventually degrade performance.

A low-power state generally implies that either the transmitter or the receiver or both are turned off to save power. A low-power mode generally includes a combination of transitions between the low-power state and the full-power state in an effort to save power while still satisfying the traffic demands. The timing of the transitions between low-power state and full-power state may ultimately depend on the amount of traffic being transmitted or received.

Figure 2:
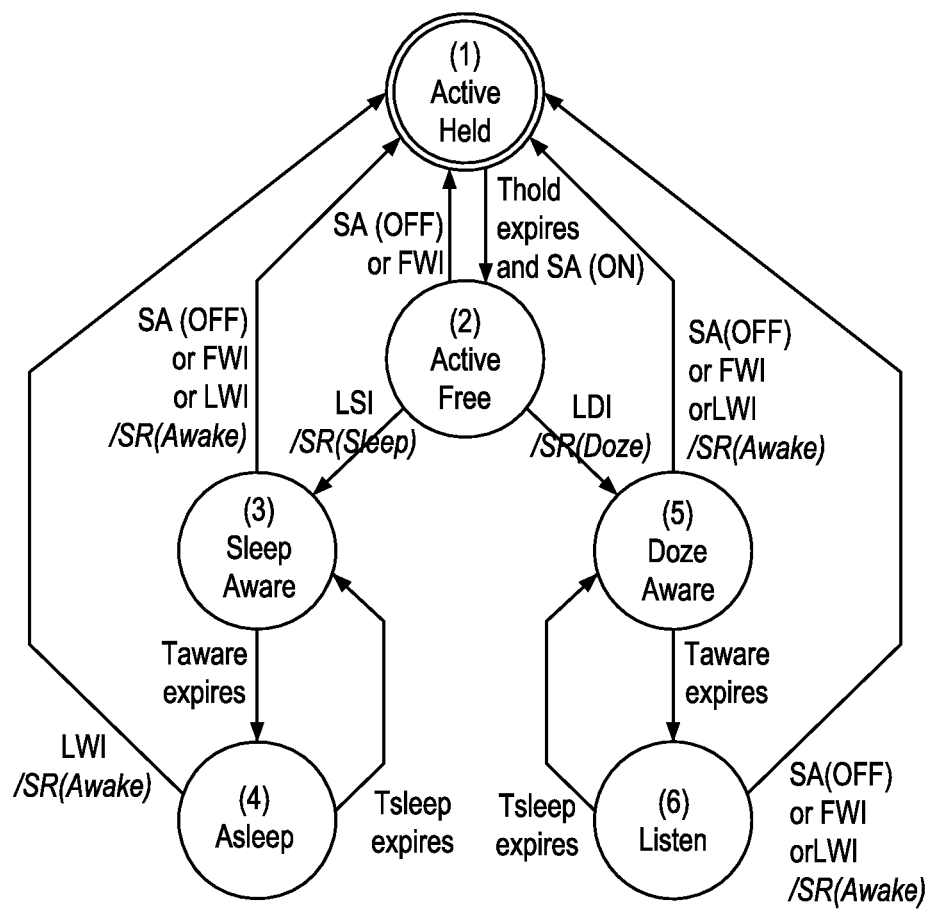
FIG. 2 is an ONU state transition diagram from the protocol ITU-T G.987.3.

For example, the ITU-T G.987.3 protocol defines a number of states for the ONU component of a PON. An ONU state transition diagram from that protocol is reproduced as FIG. 2. Referring to FIG. 2, the low-power state Asleep has both the transmitter and the receiver of the ONU turned off, while the low-power state Listen has the transmitter turned off. The remaining states are full-power and are commonly referred to as being "awake".

A low-power mode called cyclic sleep mode is characterized by cyclic transitions between the full-power SleepAware state and the low-power Asleep state, normally upon the expiration of the $T_{aware}$ and $T_{sleep}$ timers. Similarly, another low-power mode called doze mode is characterized by cyclic transitions between the full-power DozeAware state and the low-power Listen state. These or analogous definitions for low-power modes may be applied in a network where several devices (in this case, ONUs) share a common (that is, shared) communication channel (in this case, a PON fiber that runs from the splitter/combiner to the OLT—see FIG. 1).

While the approach of ITU-T G.987.3 represents an improvement in energy efficiency, it is not without its shortcomings. For example, if upstream data arrives at the UNI (user network interface) while an ONU is in the Asleep or Listen states, where the transmitter is off, the ONU may either (i) wait for the $T_{sleep}$ timer to expire, after which it may send the upstream transmission for example during the SleepAware or DozeAware states or (ii) immediately activates the LWI (local wake-up indication) and transition to for example the ActiveHeld state where it may send the upstream transmission. If the ONU waits, however, this results in delay, while returning to a full-power state immediately frustrates the power saving goal.

Figure 3:
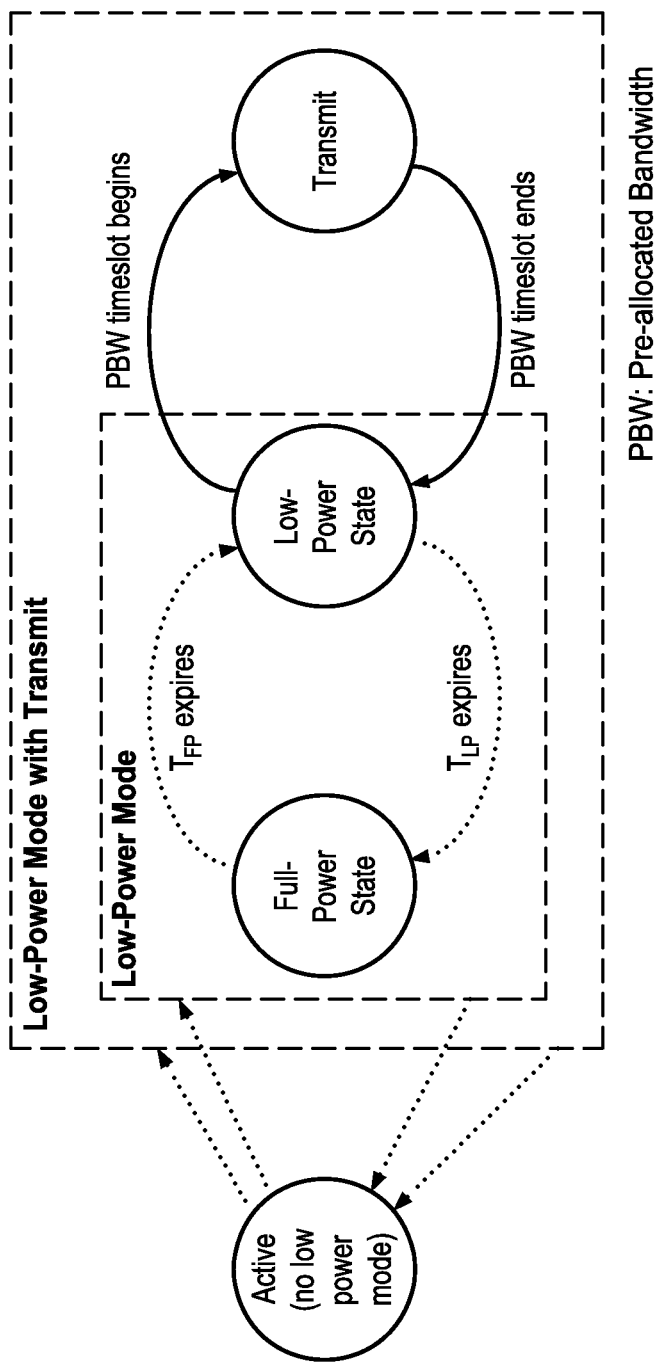
FIG. 3 is a state transition diagram illustrating node operation according to an embodiment of the present invention.

Towards the goal of optimizing power-saving while minimizing traffic disruption, the present invention facilitates a modified low-power mode by enabling a low-power transmit mode including a "Transmit" state in order to enable the transmission of upstream data even during the low-power mode. This is explained at a general but concrete level with reference to FIG. 3. FIG. 3 is a state transition diagram illustrating node operation according to an embodiment of the present invention. In the embodiment of FIG. 3, a network node is presumed to include a transmitter and a receiver, which are both powered on in the Active state. As noted in FIG. 3, there is no low-power mode associated with the Active state.

The node operated according to FIG. 3, however, may transition from the Active state to a conventional low-power mode. In this mode, it cycles between a Full-Power state where the transmitter and receiver are both powered on and a Low-Power State where they are both powered off. The cycling may or may not be regular, but in this embodiment it is governed by two timers, $T_{FP}$ and $T_{LP}$ (which are analogous to $T_{aware}$ and $T_{sleep}$ shown in FIG. 2). When the node in lower-power mode enters the Full-Power state, the $T_{FP}$ timer is started and when it expires, the node enters the Low-Power mode. At this time the $T_{LP}$ is started, and when it expires, the node returns to the Full-Power State.

Generally speaking there is no requirement that $T_{FP}$ and $T_{LP}$ are of the same duration, or that they remain constant from cycle to cycle (although no mechanism for changing them is illustrated in FIG. 3). The indication or event (not shown) that the node should transition between an Active state and a low-power mode may come from the node itself, or from another network node, or from an instruction manually imposed by a network operator.

In accordance with embodiments of the present invention, the state transition diagram of FIG. 3 also illustrates operation of a node in a low-power mode with a Transmit state (sometimes referred to herein as low-power transmit mode). In this embodiment, the low-power transmit mode may be entered from an Active state or from the conventional low-power mode. Again, the indication or event (not shown) that the node should transition to or from the low-power transmit mode may come from the node itself, for example, from the expiration of a timer, or the detection of a certain event, or it may come from another network node, or from an instruction manually imposed by a network operator.

In the embodiment of FIG. 3 a node in low-power transmit mode cycles between the low-power mode, and specifically the Low-Power state of the low-power mode and the Transmit state. In accordance with this embodiment of the present invention, the Transmit state is a state in which only the transmitter of the node is turned on. Moreover, in accordance with this embodiment the node transitions to and from the Transmit state according to a PBW (pre-allocated bandwidth) timeslot assignment. Note that according to the present invention, "PBW" is a transmission schedule for use by the node while in low-power transmit mode. Note that the PBW is frequently though not necessarily more restricted than the schedule used in a full power state or mode. PBW for the node is therefore determined prior to the node entering the Low-Power state, and in most some cases prior to the node entering low-power transmit mode. In most embodiments, determining the PBW includes receiving the PBW from another node or accessing it in a memory device.

In a preferred embodiment, in low-power transmit mode, the node also determines whether it in fact has data to transmit prior to entering the Transmit state. In such embodiments, if the node determines that it has no data to transmit it remains in a Low-Power state and in effect skips the PBW, or at least the current PBW time slot. In some implementations, the node may also "pass" on the current time slot or PBW allocation based on how long data has been buffered for transmission, or on the nature of the data if that is known. In this sense, data to transmit may but does not necessarily include control signals and similar information.

Returning to the embodiment of FIG. 3, it is noted that a node in low-power transmit mode still sets the timers $T_{FP}$ and $T_{LP}$ and cycles in and out of the Full-Power state accordingly. As should be apparent, there is no need to enter the Transmit state while in Full-Power mode, regardless of the availability of PBW, as the transmitter is already turned on. Since the receiver is also turned on, this may present an opportunity to receive a PBW allocation, if applicable, prior to returning to the Low-Power state of low-power transmit mode. It may also serve as an interval to, for example, synchronize with other nodes and perform any necessary maintenance functions. Note that being in the Full-Power state does not prevent a node from transmitting, if at all, according to a schedule.

In an alternate embodiment (not shown), however, low-power transmit mode may simply remain in low-power state from the time it is directed to do so until a $T_{LP}$ expires.

As mentioned above, the present invention is advantageously implemented where the transmission that takes place while a node is in low-power transmit mode is done using a shared channel. As will be explained more fully below, it is also advantageous to coordinate the PBW of each node sharing the transmission channel and, in some cases, the operating state of the expected recipient of those transmissions.

Figure 4:
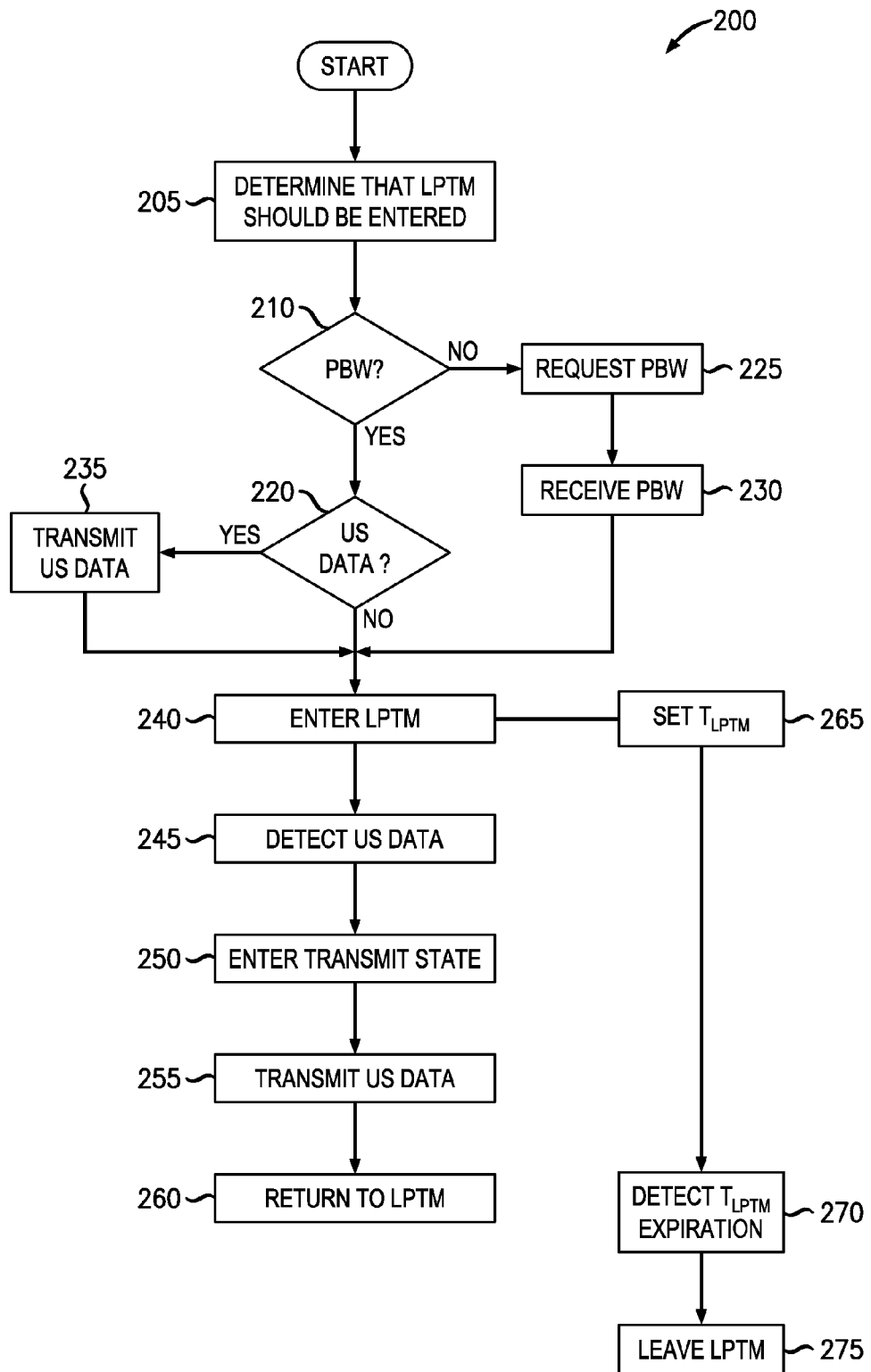
FIG. 4 is a flow diagram illustrating a method according to an embodiment of the present invention.

FIG. 4 is a flow diagram illustrating a method 200 according to an embodiment of the present invention. At Start it is presumed that the components necessary for performing the method are available and operational according to this embodiment. Note that method 200 describes a process executed by a network node that may at some point have data to transmit. The process then begins with determining (step 205) that a low-power transmit mode should be entered. It is noted that this determination may be based, for example, on a schedule or timer resident on the node or on instructions received.

In any event, in this embodiment when a node determines at step 205 that low-power transmit mode should be entered, it then determines (step 210) whether it has PBW applicable to the anticipated low-power transmit mode period. Note that in this embodiment the determination of step 210 does not involve a qualitative or quantitative analysis of the PBW, that is, whether it appears adequate, but only that it is known to the node. (The PBW for a low-power transmission mode period could be very small or even zero, although this is not expected in actual implementation.) In most cases, the PBW is or has been received in the node, usually from another network node. In a few implementations, however, it may have been generated internally to the node itself.

Here it is noted that in some implementations, receipt by a node of a PBW associated with an anticipated low-power transmit mode period may be considered the determination of both steps 205 and 210. If for some reason it is determined that the node should enter low-power transmit mode, for example based on an external instruction, but no PBW is available, then the node may either simply halt the process until PBW associated with the anticipated low-power transmit mode period is available or terminate the process entirely. In the embodiment of FIG. 4, if no PBW is available, the node sends (step 225) a request that the allocation be provided.

In the embodiment of FIG. 4, after determining whether a PBW is available, the node then determines (step 220) whether it has any data traffic to transmit prior to entering low-power transmit mode. Note that this may include data traffic currently being transmitted, or data stored in a buffer for future transmission. In this embodiment, if there is data traffic present then the node transmits the data (step 235) prior the transmission.

In this embodiment, if at step 210 the node determines that it has a PBW and determines at step 220 that there is no data to transmit, the node transitions (step 240) into low-power transmit mode. As shown in FIG. 4, if the node determined at step 210 that no PBW was available, but subsequent to a request at step 225 receives (step 230) the PBW, it may then enter low-power transmit mode (step 240) once the available data, if any, has been transmitted at step 235.

Note that in the method 200 of FIG. 4, no provision is made for delay in the event that data traffic is being received or is anticipated. In some alternate embodiments, data for both transmission and reception is considered in step 220. This may not be the case, however, where the anticipated low-power transmit mode does not involve immediately turning off the node receiver. In other cases the incoming traffic may simply be buffered until the next transition to a state in which the receiver is on. Note also that step 220 may be necessary only if the node enters low-power transmit mode at a Low-Power state, which is presently preferred.

As mentioned above, when in the Low-Power state of low-power transmit mode, the node transmitter is off (see, for example, FIG. 3), and no data is transmitted from the node. In the embodiment of FIG. 4 the node detects (step 245) data to transmit, then the node transitions to the Transmit state (step 250) by turning on the node transmitter at an available timeslot, if any, associated with the PBW determined at step 210. Note this will ordinarily though not always be at the next available PBW time slot. The detected data may then be transmitted (step 255), or at least as much of the data as can be transmitted in the time available. When the PBW time allocation has expired, the node returns to the Low-Power state of low-power transmit mode by turning off the node transmitter (step 260). The node then continues to monitor (not shown) for upstream data, of course, in case a temporary return to the Transmit state is appropriate.

Depending on the implementation, the node will normally exit low-power transmit mode at some point, especially if necessary to accommodate high volumes of data traffic. In some cases, the low-power transmit mode will include a Full-Power state (see, for example, FIG. 3) where the transmitter and receiver are both on and during which the node is able to synchronize with other nodes, receive additional PBW, if necessary, and of course receive downstream traffic. In this case, if it is necessary to exit low-power transmit mode, the node will determine that in some manner during a Full-Power state. In other cases, the node will have to exit low-power transit mode entirely to perform these functions.

In the embodiment FIG. 4, the node employs a $T_{LPTM}$ timer to accommodate transitions from low-power transmit mode. When the node enters low-power transmit mode at step 240, the $T_{LPTM}$ timer is set (step 265). The $T_{LPTM}$ timer may be used in addition to, for example, a $T_{FP}$ and $T_{LP}$ timer, if present (not shown in FIG. 4; see, for example, FIG. 3). In the embodiment of FIG. 4, When the $T_{LPTM}$ timer has been set, the node will leave (step 275) low-power transmit mode upon detecting (step 270) expiration of the timer.

In an alternate embodiment (not shown), the node may have no $T_{LPTM}$ timer but simply await an instruction to leave low-power transmit mode. Or it may leave if it determines that no additional PBW is available. Note the node may both request and receive additional PBW while in low-power transmit mode, depending on the implementation.

Figure 5:
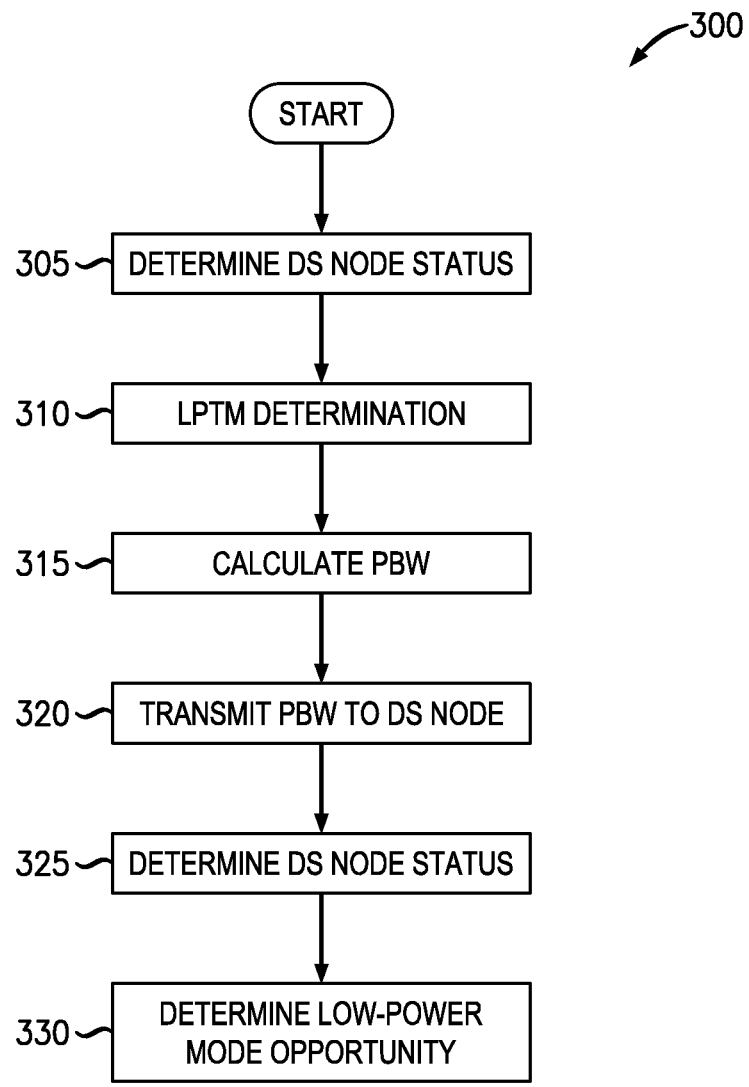
FIG. 5 is a flow diagram illustrating a method according to an embodiment of the present invention.

FIG. 5. is a flow diagram illustrating a method 300 according to an embodiment of the present invention. At Start it is presumed that the components necessary for performing the method are available and operational according to this embodiment. Note that method 300 describes a process executed by a single network node positioned at the other end of a communication channel from the "transmitting node" whose operation was described above in reference to FIG. 4. In addition, it is presumed that there may be several such transmitting nodes capable of transmitting to the single node over the communication channel, which they all share for this purpose.

For clarity, it is reiterated that the data "transmitting" node or nodes are those that may, in this embodiment, undergo the state and mode transitions described above in reference to FIG. 3; the single network node would be the recipient of such transmissions from the transmitting node or nodes. This is not to say, of course that the single network node does not also transmit data traffic, including control messages, over the communication channel.

As may be apparent, the PON 100 of FIG. 1 is one such network, with the multiple ONUs 115a through 115n capable of transmitting to the OLT 105 over a shared channel, namely the feeder portion of the optical fibers connecting the devices.

For convenience, and because it is consistent with the exemplary PON network, transmissions toward the single network node will be referred to as "upstream" and those communications from the single node to one or more of the transmitting nodes referred to as "downstream".

In the embodiment of FIG. 5, it is also presumed that there are or may be more than one downstream node, potentially transmitting over a shared communication channel. It is also presumed that the single node to some extent directs the operation of the nodes that transmit upstream.

In this embodiment, the process then begins when the upstream node, for example the OLT in a PON, determines (step 305) determines the status of at least one downstream node. Here, the node status refers to the state or mode that the at least one downstream node is in, although it may include determining other information as well. This is preferably something that the upstream node does periodically, though not necessarily on a regular schedule. In some networks the downstream node or nodes will provide their status to the upstream nodes on a regular basis, or upon the occurrence of a particular event such as a change in state or mode. In other networks, the upstream node may transmit a status inquiry to the at least one downstream node. In still other networks a combination of both are used.

In the embodiment of FIG. 5 the process continues when the upstream node at some point determines (step 310) that the at least one node should be placed in low-power transmit mode. This determination may be based on a variety of factors, but preferably it is based to a large extent on data traffic history. It may be some time, for example, since any upstream transmission was received from the downstream node, or such transmissions may be relatively small. The history may of course track use over a longer period and base the expected use in whole or in part on the day of the week, the time of the day, and so forth.

In this embodiment, the upstream node then calculates (step 315) a PBW for the downstream node to use during the anticipated duration of low-power transit mode. Preferably, the PBW calculation takes into account upstream transmission history and conditions as well as other factors that may accompany the low-power transmit mode operation. In a particularly preferred embodiment, the PBW calculation also takes into account the status of the other downstream nodes, if any, that may share the channel for upstream transmissions. The PBW calculation is described in more detail below in reference to FIG. 6.

In the embodiment of FIG. 5, once the PBW has been calculated it is transmitted (step 320) to the at least one downstream node. As mentioned above, the message including the PBW may serve for the downstream node as an instruction to enter the low-power transmit state, traffic conditions permitting. Or in some implementations (not shown) a separate instruction may be sent, before or after the PBW.

Note that at some point prior to transmitting the PBW, the upstream node checks (not shown) to ensure there is no downstream data traffic is available to be sent prior to indicating to the downstream node or nodes that transition to low-power transmit mode is appropriate. If so, of course, the data may be transmitted or the instruction to enter low-power transmit mode delayed.

In the embodiment of FIG. 5, the upstream node then determines (step 325) the status of the at least one downstream node. Naturally, the determination of step 325 is preferably made when a certain delay has followed the PBW transmission (or any instruction to enter low-power transmit mode, whichever is later). The length of this delay is a function of the expected time for the one or more downstream nodes to determine whether to end low-power transmit mode at this time and report to the upstream node. In this embodiment, the upstream node then determines (step 330) whether the upstream will be placed in a low-power mode.

It is an advantage of the present invention that the upstream node may allocate the PBW for each of the one or more downstream nodes not only so that they do not interfere with each other's upstream transmissions, but also to schedule low-power operational periods for the upstream node. In many implementations there will be a number of downstream modes potentially transmitting over a shared communication channel, and their entry into low-power transmit mode and PBW may be arranged to make this possible.

Figure 6:
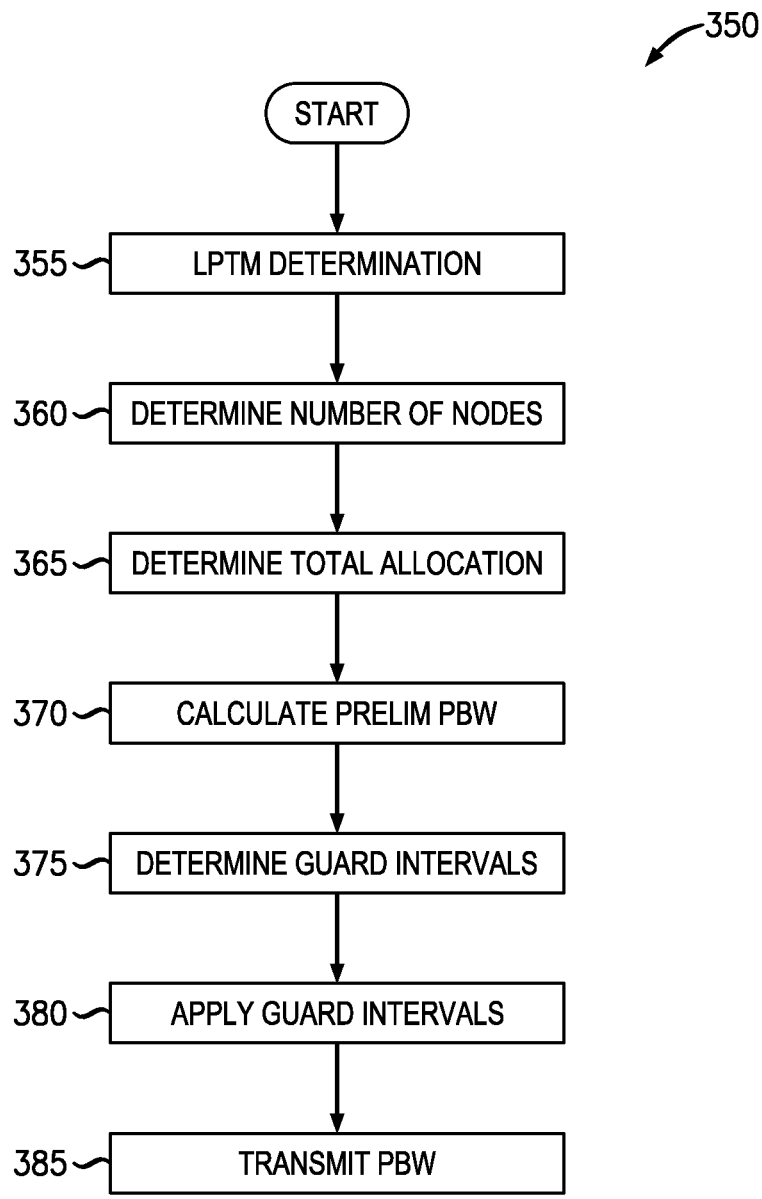
FIG. 6 is a flow diagram illustrating a method according to an embodiment of the present invention.

FIG. 6 is a flow diagram illustrating a method 350 according to an embodiment of the present invention. At Start it is presumed that the components necessary for performing the method are available and operational according to this embodiment. The process then begins with a determination (step 355) that at least one downstream node should enter low-power transmit mode, conditions permitting. As should be apparent, this step is analogous to step 310 shown in FIG. 5 and described above. Note, however, that in some embodiments, a PBW calculation may precede such a determination and, in some cases, even influence the determination.

In the embodiment of FIG. 6, the upstream node then determines (step 360) the number of downstream nodes to include in the calculation. There may be only one, of course, but in most cases there will be a plurality and, as mentioned above, there is an advantage to including in the PBW calculation all downstream nodes that share, or may share a common communication channel. The total time available for upstream transmissions is then determined (step 365) as well.

In this embodiment, a preliminary PBW is then calculated (step 370). The preliminary PBW includes an allocation of time for each downstream node to make upstream transmissions while in low-power transmit mode. The preliminary allocation will include a start and finish time for each time slot in the allocation. The PBW duration for each downstream node may, but frequently will not be the same as all others. In fact, in a preferred embodiment the times are allocated based at least in part on recent upstream transmission behavior.

In this embodiment, the upstream node then determines (step 375) the guard intervals to be respectively applied to each downstream node's PBW. A guard interval is an allocation of time applied to each timeslot of the preliminary PBW to account for potential clock drift during the time that the respective downstream node is expected to remain in the low-power states where the receiver may be turned off. If there is more than one downstream node in the calculation, the guard intervals may be but are not necessarily the same for each device. If there is more than one timeslot in the PBW for a given device, the guard intervals may also vary in size from one timeslot to the next. The process of determining the guard intervals will be described in more detail below.

In the embodiment of FIG. 6, the guard intervals are then applied (step 380) to the PBW, which may then be transmitted (step 385) to the at least one downstream node at the appropriate time. As should be apparent, applying the guard intervals means shortening the timeslot allocations of the preliminary PBW without compressing the total allocation to provide some separation between allocations to allow for any clock drift. It is noted, however, that it is possible that a guard interval calculation be performed and still result in a zero adjustment to the preliminary PBW, although this is expected to be atypical.

It is also noted here that the downstream transmission may not be immediate. In some cases (not shown), for example, there may be a delay as the status of the downstream nodes is confirmed. In some embodiments (also not shown), the calculation may be redone if the delay is sufficiently long.

In most embodiments, the upstream node and the downstream node (not shown each include a memory device that is non-transitory in the sense of not being merely a propagating signal. The memory device may store data and includes program instructions that when executed by a processor of the respective node cause the node to perform its functions in accordance with the methods of FIGS. 4 through 6, 8 and 9, for example in compliance with the state transition diagram of FIG. 7.

The methods illustrated herein reflect representative embodiments, and some variation may be made in some implementations without departing from the claimed invention. For example in some embodiments, operations may be added to those shown in the figures and in other cases, some operations may be omitted. Operations in the methods described may be performed in any logically consistent order unless otherwise stated in a particular claim.

In some embodiments, the present invention may be implemented in an optical access network, and specifically in a PON, such as the network 100 illustrated in FIG. 1. Application of the present invention in a PON environment will now be described in more detail. Note, however, that any of the features described in association with these embodiments may be equally applicable to other types of networks as well.

The desirability of assigning guard intervals has been mentioned above. The concept will now be described in the PON context. The problem being addressed, of course, is to mitigate the effects of any relative clock drift that may occur during the time that one or more nodes are in low-power transmit mode.

At the instant the ONU transitions to the Asleep state during the STM, it is in fact synchronized (in time) with the OLT. In a preferred embodiment, the ONU continues to maintain its clock, keeping track of the frame numbers, even during the Asleep state when it does not receive any data. The ONU then uses this same time reference to initiate an upstream transmission when transitioning from the Asleep state. However, a problem occurs in that the ONU clock may have drifted with respect to the OLT clock during the time in the Asleep state. This drift is usually very small. A typical crystal has a drift deviation of smaller than 100 ppm which translates to 1 us of clock drift in 10 ms duration in the Asleep state.

In some embodiments, the OLT takes the clock drift into account by adding a guard interval both before and after each timeslot in the PBW for the ONU. The guard interval on each side of the timeslot is set to be at least $$\text{drift}_{ONU} + \text{drift}_{OLT} + \Delta t$$

where $\text{drift}_{ONU}$ and $\text{drift}_{OLT}$ are the clock drifts of the ONU and OLT, respectively, and $\Delta t$ is an additional safety interval that may be added to the guard interval, with all quantities expressed in seconds. The clock drift $\text{drift}_{ONU}$ and $\text{drift}_{OLT}$ during a duration $T_s$ seconds in the Asleep state are calculated from their respective drift deviation specifications $d_{ONU}$ and $d_{OLT}$ (in ppm) as follows:

$$\text{drift}_{ONU} = d_{ONU} \times 10^{-6} \times T_s$$

$$\text{drift}_{OLT} = d_{OLT} \times 10^{-6} \times T_s.$$

If the OLT clock drift is very small, the $\text{drift}_{OLT}$ term may be neglected. The value of $d_{OLT}$ from the hardware specification is usually known and can be a parameter that can be configured manually at the OLT for the power management, e.g., using control messages. If the exact specification for $d_{OLT}$ is unknown at the OLT, an upper limit may be used. The value of $d_{ONU}$ is sent by the ONU to the OLT, for example, using a control message. It is convenient to include the messaging of $d_{ONU}$ as part of the registration process for the ONU. Similar to the OLT, if the exact specification for $d_{ONU}$ is unknown, an upper limit may be used.

As an alternative to the above process for configuring the value for $d_{OLT}$ and sending the value for $d_{ONU}$, the OLT may use an estimation procedure to directly estimate the clock drift between the OLT and the ONU which works as follows.

1. When the ONU first registers, the OLT uses a configurable initial value $\text{drift}_{init}$ for the clock drift when an estimate of the clock drift is not yet available. The guard interval on either side of each timeslot in the PBW for the ONU is set to be $$\text{drift}_{init} + \Delta t$$

where $\Delta t$ is an additional safety interval that may be added to the guard interval.

2. When the OLT receives the first US burst transmitted from the ONU during the STM, it calculates $$D = (T_{PBW} + RTT/2) - T^*_{PBW}$$

where $T_{PBW}$ is the start time of the PBW timeslot (from the ONU's view) that is assigned to the ONU by the OLT, RTT is round-trip time to the ONU, and $T^*_{PBW}$ is the actual time when the start of the upstream burst is received at the OLT. Note that $T_{PBW}$ RTT/2 gives the assigned start time of the PBW timeslot from the OLT's view. If the difference D calculated above is positive, then Guard interval before PBW timeslot=$|D|+\Delta t$,
   Guard interval after PBW timeslot=$\Delta t_{min}$,
   where $|D|$ is the absolute value of D, $\Delta t$ is an additional safety interval, and $\Delta t_{min}$ is a certain minimum guard interval. Vice-versa, if the difference calculated above is negative, then
   Guard interval after PBW timeslot=$|D|+\Delta t$,
   Guard interval before PBW timeslot=$\Delta d_{min}$.

3. When the OLT receives the next upstream burst transmitted from the ONU during the STM, it again calculates the same difference D mentioned in Step 2. If the difference D is positive, then
   Guard interval before PBW timeslot=$\max(|D|+\Delta t,$ previous guard interval before PBW timeslot)
   and the guard interval after the PBW timeslot is left unchanged. Vice-versa, if the difference calculated above is negative, then
   Guard interval after PBW timeslot=$\max(|D|+\Delta t,$ previous guard interval after PBW timeslot)
   and the guard interval before the PBW timeslot is left unchanged.

4. If the difference D remains consecutively positive for a specific number (which can be configured according to the need) of upstream bursts, then
   Guard interval after PBW timeslot=$\Delta d_{min}$.
   Vice-versa, if the difference D remains consecutively negative for a specific number (which can be configured according to the need) of upstream bursts, then Guard interval before PBW timeslot=$\Delta d_{min}$.

The above procedure minimizes the upstream bandwidth that may be wasted due to the guard intervals by tracking the guard interval required before and after the PBW timeslot separately. Alternately, to simplify the estimation procedure, the same guard interval may be used both before and after the PBW timeslot and set this to be Guard interval=$\max(|D|+\Delta t,$ previous guard interval).

The guard interval may also be calculated by using the maximum of $|D|$ over upstream transmissions received from the ONU within a particular time window, or over the last several number (a configurable parameter) of upstream transmissions received from the ONU.

Figure 7:
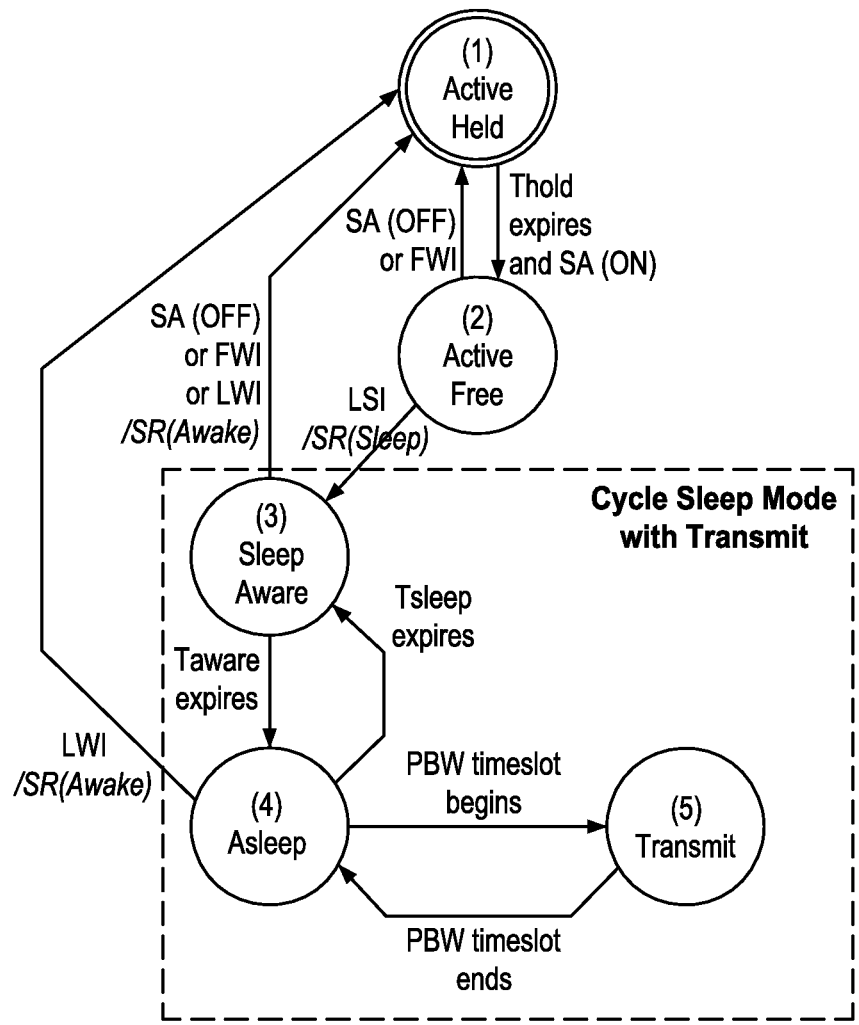
FIG. 7 is a state transition diagram illustrating node operation according to an embodiment of the present invention.

In one PON embodiment, the low-power transmit mode is implemented as a sleep mode with transit, which may also be referred to as Sleep-Transmit Mode (STM), an overview of which may be seen in FIG. 7, a state transition diagram for an ONU. As should be apparent, this figure is a modification of the state transition diagram according to G.987.3, which is shown in FIG. 2.

In the embodiment of FIG. 7, STM is entered from the Active Free state, which transitions to a SleepAware state. In STM, the ONU cycles between the SleepAware state and the Asleep state as the $T_{sleep}$ and $T_{aware}$ timers respectively expire. In most cases, the duration of $T_{sleep}$ and $T_{aware}$ timers are configured by an OLT using control messages.

Preferably, the timer for $T_{sleep}$ is not interrupted by transitions between the Asleep state and the Transmit state. That is, the duration of $T_{sleep}$ that occurs during the Transmit state is essentially treated as part of the Asleep state. As soon as the $T_{sleep}$ timer expires, the ONU transitions to the SleepAware state.

In this embodiment, it is also presumed that the OLT calculates the PBW, which may be conveyed to the ONU through a PBWmap field in the common downstream frame transmitted by the OLT. In an alternate embodiment, more applicable to IEEE Ethernet PONs, the PBW may be conveyed using a specific GATE message to the ONU. However conveyed, when the ONU is in the Asleep state of STM, it transitions to the Transmit state according to the start and finish of a PBW time slot, preferably though not necessarily only when there is upstream data to transmit.

As described above, both the ONU transmitter and the ONU receiver are on when the ONU is in the SleepAware state and off when the ONU is in the Asleep state. In the Transmit state, only the transmitter is turned on. Note, however, that in some implementations of the present invention, the receiver may for some reason be on for some or all of the time that the downstream node is in the Transmit state, but the OLT treats it as if it were off and does not send downstream traffic. (Of course, if the receiver is on for a time while in the Transmit state, this detracts from the power saving advantages of the present invention.) The OLT buffers all the incoming downstream packets for the ONU if the ONU is in the Asleep or Transmit states.

The transition from the Asleep state to the Transmit state may vary from one embodiment to another. In some embodiments, the ONU is in the Transmit state from the beginning of a PBW time slot to the end of that slot (regardless of whether upstream traffic is present), although this is not preferred. In a preferred embodiment, the transition to the Transmit state only occurs at the beginning of the PBW time slot if there is upstream traffic available to be sent.

In some implementations, if the ONU is in the Asleep state during a PBW time slot it may immediately transition to the Transmit state and initiate upstream transmission when upstream data arrives from the User Network Interface (UNI). In other embodiments, the ONU may buffer the upstream traffic and await the beginning of the next PBW timeslot begins (or another opportunity to transmit the data occurs, for example a transition to the Sleep Aware state). In any case, the ONU returns to the Asleep state when the PBW timeslot ends, or in some implementations prior to that if there is no more upstream data to transmit. As mentioned above, however, if the ONU has transitioned to the SleepAware state, the transmitter need not be turned off.

Note that in the Transmit state the ONU may only transmit upstream during a PBW time slot, in some implementations the transmitter may be turned on prior to the beginning of a time slot to account for any necessary transition time. In this case, of course, actual transmission should not occur until the beginning of the PBW time slot. In other implementations, the OLT may also or instead take transition time into account when calculating the PBW.

Note also that at the point the ONU transitions to the Asleep state, it is synchronized with the OLT. The ONU continues to maintain its clock, keeping track of the frame numbers, even during the Asleep state when it does not receive any data, and uses this as the time reference to identify PBW timeslots. As described above, according to the present invention the PBW calculation preferably takes into account any potential clock drift.

Figure 8:
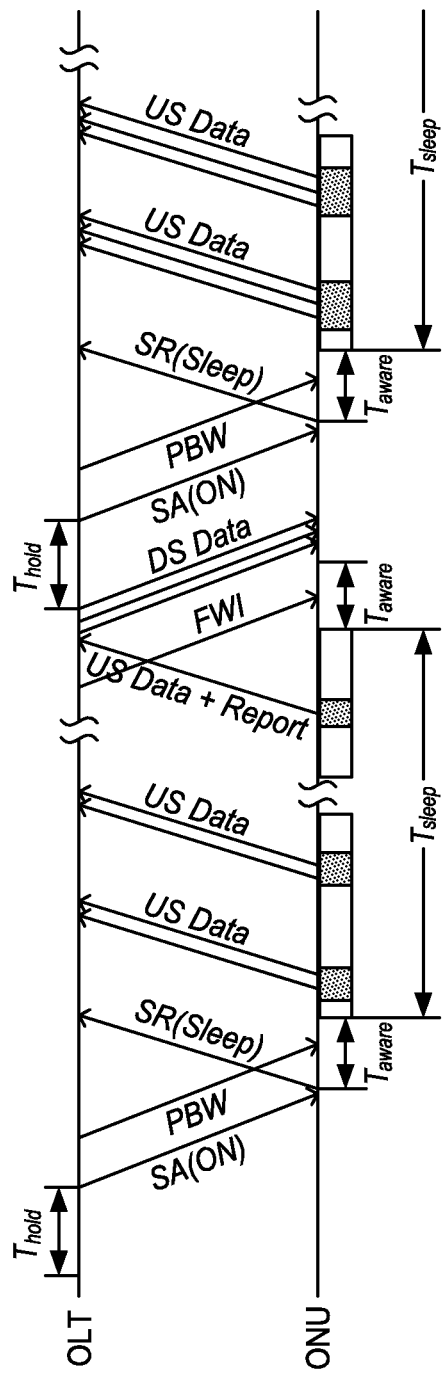
FIG. 8 is a timing diagram illustrating the messages exchanged between the OLT and the ONU for the STM according to an embodiment of the present invention.

FIG. 8 is a timing diagram illustrating the messages exchanged between the OLT and the ONU for the STM according to an embodiment of the present invention. Reading from the left side of the diagram, where the ONU is in the ActiveHeld state, in this embodiment if the OLT observes no downstream packets to the ONU for a certain period ($T_{hold}$), it requests the ONU to enter into ActiveFree state by sending the SA(ON) message. Although it is not explicitly shown in FIG. 8, the OLT may also configure the respective durations for $T_{sleep}$ and $T_{aware}$ using control messages to the ONU. Once in the ActiveFree state, the ONU determines whether there is any upstream data available for transmission. If not, the ONU may initiate the STM transition by sending the SR(Sleep) message to the OLT and moving to the SleepAware state.

In this embodiment, the OLT specifies the PBW to the ONU during the SleepAware state before the ONU transitions to the Asleep state. During the period $T_{sleep}$, the PBW provides one or more, and usually several timeslots (or grants), shown by the shaded boxes in FIG. 8, when the ONU can transmit bursts of upstream data by transitioning into the Transmit state and turning on the transmitter. As described above, when the PBW timeslot ends (and in some embodiments earlier if there is no upstream data available) the transmitter is turned off and the ONU returns to the Asleep state.

In this embodiment, the ONU may send a REPORT message to the OLT containing a status report of (upstream) data traffic queue size, which essentially forms a request for upstream bandwidth. In FIG. 8 this is shown in the last timeslot during $T_{sleep}$, though it could have been sent at another time. After $T_{sleep}$ expires, the ONU cycles back to the SleepAware state and the $T_{aware}$ timer is started.

In the exemplary embodiment of FIG. 8, the OLT has determined that it has data to transmit downstream to the ONU. When the ONU is in the SleepAware state, the OLT may send a wake-up indication (for example, an FWI) to the ONU, initiating a transition into the ActiveHeld state. After sending all the downstream data, the process may repeat if there are no downstream packets are available for the ONU for a certain period $T_{hold}$.

Although it is not shown in FIG. 8, note that a local wakeup indication (LWI) may also be triggered by the ONU during the STM, that is, the Asleep or SleepAware states, for example, when there is excessive upstream traffic from the user network interface (UNI). When this occurs, the ONU transitions to the ActiveHeld state.

Figure 9:
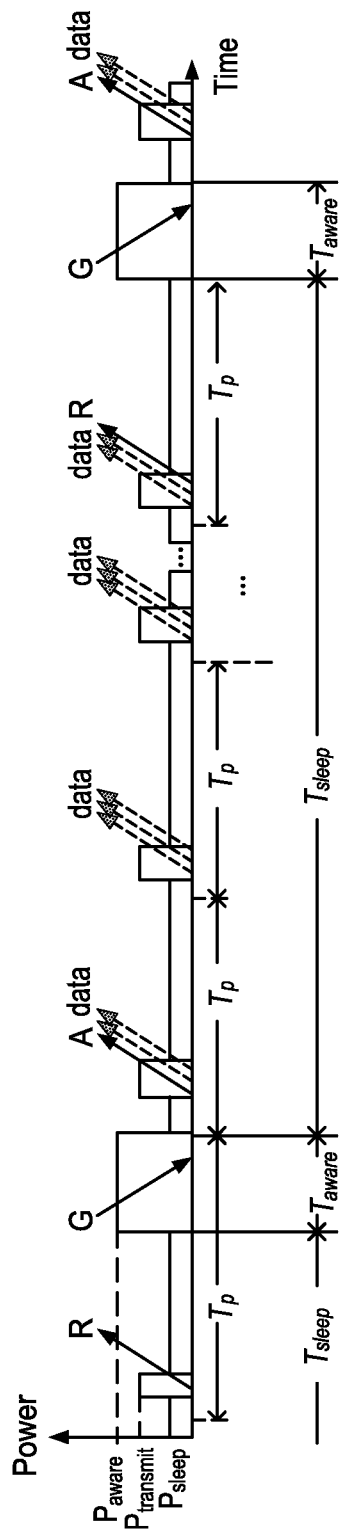
FIG. 9 is a timing diagram showing the detailed exchange of messages between the OLT and the ONU, as well as the power consumption, during the STM according to an embodiment of the present invention.

In order to facilitate the bandwidth allocation for multiple ONUs in the PON, each of which may or may not operate in a low-power mode such as STM, the concept of a common polling cycle with period $T_p$ may be introduced. FIG. 9 is a timing diagram showing the detailed exchange of messages between the OLT and the ONU, as well as the power consumption, during the STM according to an embodiment of the present invention. In the embodiment of FIG. 9, the ONU sends a status report message (R) with the queue size(s) during one of the PBW timeslots. In response, the OLT sends a DS frame or GATE message (G) containing grants for the PBW. During the first PBW timeslot after G, the ONU may send an Acknowledgment (A) to the OLT followed by any US burst transmissions. Once again, preferably during the last PBW timeslot, the ONU sends the R message and the process repeats. The expected power savings are represented (not necessarily to scale) on the vertical axis in FIG. 9, which provides an indication of the power-usage level in the Sleep state, the Transmit state, and the SleepAware state of STM. The duration of the timers $T_{sleep}$ and $T_{aware}$ that regulate state changes in STM are also represented.

Figure 10:
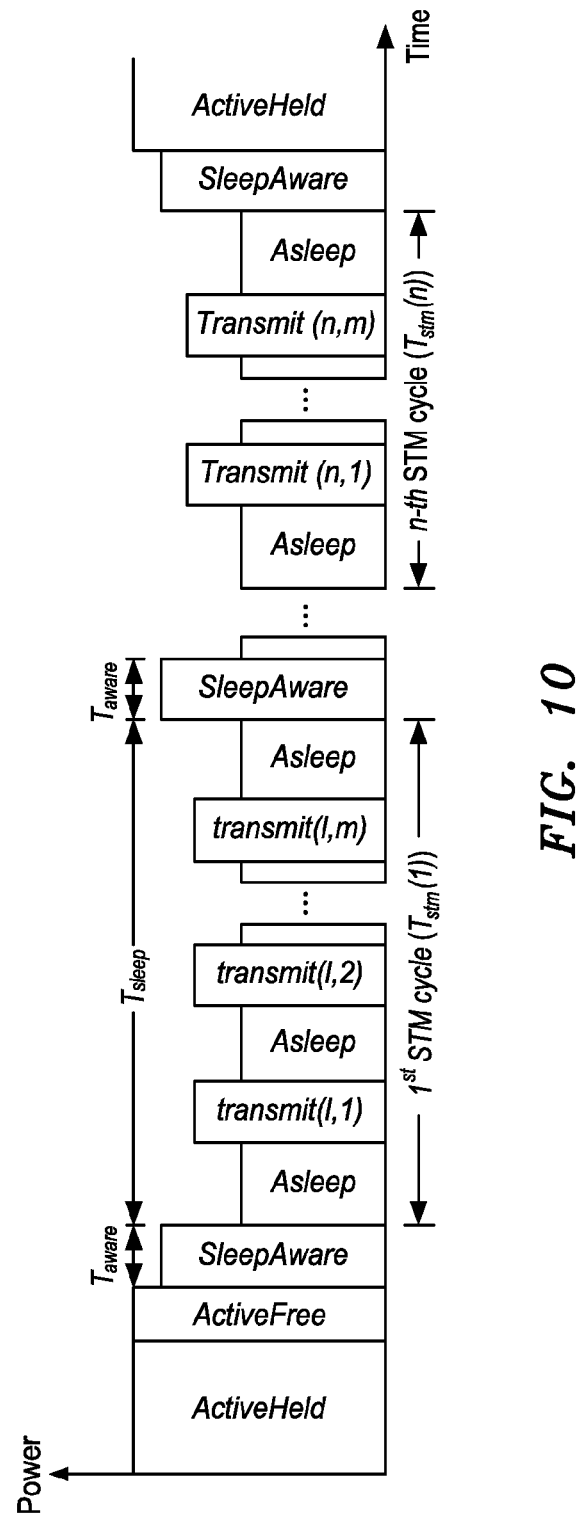
FIG. 10 is a timing diagram showing the transitions between different states and the power consumption of different states for the STM according to an embodiment of the present invention.

In similar fashion, FIG. 10 is a timing diagram showing the transitions between different states and the power consumption of different states for the STM according to an embodiment of the present invention. Expected power savings are again represented (not necessarily to scale) on the vertical axis. In the embodiment of FIG. 10, after the full-power ActiveHeld and ActiveFree states, the ONU enters an STM consisting of the SleepAware, Asleep, and Transmit states. During the STM, the ONU goes through multiple periods of $T_{aware}$ and $T_{sleep}$ before exiting STM back to the ActiveHeld state. The $T_{sleep}$ duration from the entry into Asleep from SleepAware to the instant of exit back to SleepAware is herein called an STM cycle. Two STM cycles n are represented, a $1^{st}$ and an $n^{th}$, lasting for durations $T_{stm}(1)$ and $T_{stm}(n)$, respectively although as indicated by the ellipsis, there may be additional cycles. That is, there can be one or several such STM cycles over the duration of the STM. Within each STM cycle of period $T_{sleep}$, the ONU may be assigned multiple timeslots m in the PBW. For example, Transmit (1, m) in FIG. 10 represents the $m^{th}$ Transmit state of the $1^{st}$ STM cycle.

Appendix I contains a pseudocode listing illustrating implementation of a management process using STM according to an embodiment of the present invention.

Note that the sequences of operation described above and illustrated in the referenced figures represent exemplary embodiments; some variation is possible within the spirit of the invention. For example, additional operations may be added to those explicitly shown in each figures, and to the figures taken as a whole, and in some implementations one or more of the illustrated operations may be omitted. In a preferred embodiment, a correction for the frequency offset between respective clocks on an OLT and ONU to facilitate reception of the upstream traffic in the OLT. In addition, the operations of the methods may be performed in any logically-consistent order unless a definite sequence is recited in a particular embodiment.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method of managing data transmission in a communication network, comprising transitioning a network node into a Transmit state, the node having a transmitter and a receiver for data transmission, and wherein the Transmit state is a condition wherein the transmitter is turned on for data transmission only during timeslots provided for by a PBW (pre-allocated bandwidth) and remains off otherwise;

wherein the PBW comprises guard intervals; and wherein the guard intervals comprise a leading guard interval before each timeslot and a lagging guard interval following each timeslot, at least one of which is determined as a function of the difference between the anticipated and actual start times of a previous transmission, if any.

2. The method of claim 1, wherein the transmitter is only turned on for data transmission only during timeslots provided by the PBW when there is data available to transmit.

3. The method of claim 1, wherein the receiver remains off during the Transmit state.

4. The method of claim 1, further comprising transitioning the network node into a low-power transmit mode, and wherein the low-power transmit mode comprises in addition to the Transmit state a Full-Power state in which both the transmitter and the receiver are on and a Low-Power state in which the transmitter is off.

5. The method of claim 4, wherein the receiver is off during the Low-Power state.

6. The method of claim 4, further comprising, while in the low-power transmit mode, a combination of transitions between the Full-Power state and the Low-Power state, wherein the network node only transitions into the Transmit state from the Low-Power state.

7. The method of claim 1, further comprising receiving the PBW in the network node.

8. The method of claim 7, wherein the network node is an ONU (optical network unit) in a PON (passive optical network).

9. The method of claim 7, wherein the PBW is received from a control node over a communication channel.

10. The method of claim 9, wherein the control node is an OLT (optical line terminal) of the PON.

11. The method of claim 1, further comprising calculating the PBW.

12. The method of claim 11, wherein the PBW is a function of the network node's transmission history.

13. The method of claim 11, wherein the network node is one of a plurality of network nodes configured to transmit over a shared communication, and further comprising calculating the PBW for at least a plurality of the plurality of the network nodes.

14. The method of claim 1, further comprising calculating the at least one guard interval.

15. The method of claim 14, further comprising calculating the at least one guard interval subsequent to each transmission from the network node.

16. The method of claim 1, wherein the communication network comprises a control node and a plurality of controlled network nodes, and further comprising placing the control node in a low-power state subsequent to coordinating low-power transmit modes for each of the controlled network nodes.

* * * * *